United States Patent [19]

Tabata et al.

[11] Patent Number: 4,982,329

[45] Date of Patent: Jan. 1, 1991

[54] SELF-CONTAINED UNMANNED VEHICLE

[75] Inventors: Hidemitsu Tabata; Teppei Yamashita; Masanori Onishi; Yuji Nishikawa, all of Ise, Japan

[73] Assignee: Shinko Electric Co., Ltd., Tokyo, Japan

[21] Appl. No.: 210,845

[22] Filed: Jun. 24, 1988

[30] Foreign Application Priority Data

Jun. 27, 1987 [JP] Japan ................................. 62-160593
Sep. 21, 1987 [JP] Japan ................................. 62-234787

[51] Int. Cl.$^5$ ............................................. G06F 15/50
[52] U.S. Cl. ................... 364/424.02; 318/587; 180/167; 180/169
[58] Field of Search ....................... 364/424.01, 424.02, 364/513; 180/167–169; 318/587

[56] References Cited

U.S. PATENT DOCUMENTS

| | | | |
|---|---|---|---|
| 4,652,803 | 3/1987 | Kamejima et al. | 318/587 |
| 4,674,048 | 6/1987 | Okumura | 318/587 |
| 4,716,530 | 12/1987 | Ogawa et al. | 318/587 |
| 4,809,178 | 2/1989 | Ninomiya et al. | 318/587 |
| 4,821,192 | 4/1989 | Taivalkoski et al. | 364/424.02 |
| 4,829,219 | 5/1989 | Penkar | 364/513 |
| 4,835,730 | 5/1989 | Shimano et al. | 364/513 |

*Primary Examiner*—Gary Chin
*Attorney, Agent, or Firm*—Wenderoth, Lind & Ponack

[57] ABSTRACT

A self-contained unmanned vehicle (robot car) is designed to be capable of independently traveling, on the basis of previously specified geographic data, to convey parts, finished products, etc. etc. in a factory or similar, and achieves fine travel position control while simultaneously reducing the X memory capacity for the geographic data and ensures easy preparation and entry of geographic data and facilitates the comprehensibility of the contents of the geographic data. The vehicle includes: a first memory for storing the coordinate data of the node located on the traversable travel path; a second memory for storing the geographic data consisting of operation codes indicating the travel path conditions, and a scene command with the main operands denoting the continuous distance of the travel path under these operation codes; a decision-making unit for determining the path to be traversed by establishing the nodes to be traversed by the unmanned vehicle on its approach towards the designated target location; and a travel control section for controlling the travel movement of the unmanned vehicle on the basis of scene commands in accordance with the pre-set sequence in which the predetermined nodes are to be traversed; and, furthermore, a geographic data inputting device for entering the geographic data; and a geographic data display for displaying, during the input operation to enter the geographic data with the geographic data input device, line segments whose length corresponds to the value of the main operand, by means of a line type previously set in accordance with the operation code type.

10 Claims, 9 Drawing Sheets

FIG. 3

| 2 Byte | 2 Byte | 2 Byte |
|---|---|---|
| Operand | Main operand | Ancillary operand |
| Operand | Main operand | Ancillary operand |
| Operand | Main operand | Ancillary operand |
| Operand | Main operand | |
| Operand | Main operand | Ancillary operand |
| Operand | Main operand | Ancillary operand |
| Operand | Main operand | Ancillary operand |

(Unit: mm)

SELF-CONTAINED UNMANNED VEHICLE

BACKGROUND OF THE INVENTION

1. Field of the Invention

The present invention relates to an unmanned vehicles for the transportation of parts and finished products in factory premises in general, and in particular to a self-contained unmanned vehicles capable of independent locomotion on a pre-determined trajectory or travel path on the basis of pre-determined geographical data.

2. Description of the Prior Art

In connection with the significant progress made in recent years in the area of factory automation (FA), various types of unmanned vehicles have been developed for the automatic handling of parts and components etc. in factory, warehouse, and other locations. While, for example, magnetic induction type or optical induction type unmanned vehicles are in general use, the movement of these unmanned vehicles follows the signals of indicators located in the premises and designed to flag the vehicle trajectory in or on the ground.

The vehicles herein referred to as self-contained unmanned vehicles have been developed, and are capable of independently determining the nodal points to be traversed by searching for the optimum path on the basis of the target-point node indication and of automatically moving up to the target point node. The term "node" in this context implies a stop point, turn-off point, operating point or similar point and may also imply any point in which a change in the travel/movement condition of the unmanned vehicle in terms of its travel speed and forward direction of movement takes place.

Normally, a self-contained unmanned vehicle has a built-in memory into which are entered geographical input data about the travel path. This route mapping consists of coordinate data giving the coordinates of all and every nodal point and geographic data specifying the distance from the pre-determined travel path across the nodal points to the lateral boundaries (left and right side walls) of the trajectory. The geographical data, in particular, are set as the values for the distance from the pre-determined trajectory to the lateral boundaries of that trajectory at pre-defined intervals (several tens of millimeters) along said pre-determined trajectory, and entered as the memory input. As and when required, the appropriate data are read out from the memory and form the basic reference data for the automatic movement control of the self-contained unmanned vehicle until the target nodal point.

To facilitate the understanding of the present invention, a pulse motor of prior art will be described next, with reference to FIGS. 8 to 10.

The top part of FIG. 8 is a general front view of the unmanned vehicle 1A, with 2L being the left-hand drive wheel, 2R the right-hand drive wheel, 3L the motor for driving the left-hand drive wheel 2I, 3R the motor for driving the right-hand drive wheel 2R, 4L the pulse-encoder for detecting the rotational speed of the left-hand drive wheel 2L, 4R the pulse-encoder for detecting the rotational speed of the right-hand drive wheel 2R, and 5 & 5 are wheels. The wheels 5 & 5 are free to rotate with respect to their respective shaft cores and also free to rotate with respect to the shaft direction perpendicular to the respective shaft cores. 6L and 6R are ultrasonic signal transmitters/receivers (hereinafter referred to as ultrasound sensors) for detecting the distance to the left and right trajectory boundaries. 7A is a control device.

As shown in FIG. 9, said control device 7A has a central processing unit (CPU 8, a program memory 9A, a work memory 10A, an interface circuit 11 and a motor drive circuit 12. A program controlling CPU 8 is written into said program memory 9A, while the geographical trajectory data are written into the work memory 10A. These geographical data consist of coordinate data giving the coordinates of all and every nodal point and geographic data specifying the distance from the pre-determined travel path across the nodal points to the lateral boundaries (left and right side walls) of the trajectory.

FIG. 10 shows the geographical data MLA giving the distance to the left trajectory boundary side wall W written into the work memory 10A. Said geographical data MLA are composed of the data la1 – lan giving the distances to the left side wall from the pre-determined trajectory traversed by the unmanned vehicle 1A at every specified distance 1. These distance data la1 – lan consist of two bytes each. Similarly, the geographical data MRA which are not shown here and give the distances to the right side wall of the vehicle's trajectory are composed of individual distance data similar to the geographical data MLA described above. These data are written into the work memory 10A.

Item 13 in FIG. 9 is a communication device, receiving instructions (giving the target nodal points) received by wireless transmission from the central control station (not shown here). The instructions received by said communication device 13 are furnished to the control unit 7A.

This conventional self-contained vehicle 1A with above configuration has a CPU 8 for controlling the vehicular movement as described below in accordance with the program written into the program memory 9A.

If a target node is provided by the central control station, the CPU 8 will search for the appropriate trajectory on the basis of the geographical data written into the work memory 10A so as to determine the node(s) to be traversed on the way toward the target. In the interval between one node and the next, the CPU 8 reads out the appropriate distance to the left and right side wall boundaries at each pre-defined distance 1, on the basis of the geographical data MLA and MRA. The CPU 8 drives the motors 3L and 3R so that the vehicle moves at a constant speed along the pre-determined travel path across the consecutive sequence of nodal points. The CPU 8 measures the distances to the left and right side wall boundaries on the basis of the signals supplied from the ultrasound sensors at each pre-defined distance 1. It also measures the travel distance from the node traversed immediately beforehand on the basis of the signals supplied from the pulse encoders 4L and 4R. From these measurement results, the CPU 8 assesses whether or not the current travel position deviates from the correct travel position obtained on the basis of the geographical data, and corrects the position if a deviation has been detected. This ensures that the unmanned vehicle 1A constantly travels through the correct travel position to arrive at the target node (destination) by passing through the consecutive sequence of nodal points.

The conventional unmanned vehicle 1A described above gives rise, however, to the following problems (1)–(4). (1) When the measurement intervals for measuring the distance to the side walls W is shortened to increase the accuracy of travel, a vast memory capacity will be required since the necessary quantity of geographical data will be commensurate with the number of measurements performed.

Thus, for example, the number of geographical data required to traverse only the distance lo is lo/1 so that, if the distance to the side walls is given at a millimeter accuracy, a 2 byte (16 bit) memory capacity is required for 1 geographical data since the width of the trajectory is normally in the meter order of magnitude. If, by way of example, $1 = 10$ mm and lo$=5,000,000$ mm, the memory capacity required for the geographical data will be $$x, 500,000/10 = 10^6 (\text{byte}) \qquad (1).$$

If geographical data are available for both sides, the total memory capacity required for all geographical data will be double the memory capacity calculated in (1).

If, however, l assumes a value of 50 mm, the memory capacity will be 1/5th that of equation 1, but this will lead to uneven, jittery travel control with the impossibility of achieving smooth locomotion.

(2) Since the geographical data are expressed in terms of the side wall distance at each pre-defined interval 1 traversed by the unmanned vehicle 1A, it follows that there are no geographical reference data within this distance 1. It is therefore not possible to achieve a very fine travel position control.

(3). A large number of data are required to draw up the geographical data so that the preparation of these data is a laborious and time-consuming procedure. Since, furthermore, data are handled in the form of numerical data, it is clear that it is not easy for humans to make sense of these.

(4) As the environment surrounding &:he trajectory becomes complicated, and the number of nodal points increases, so the quantity of information to be entered as memory input increases. This not only makes the input operation a tedious and time-consuming task, but also leads to the problem that when attempting to display all node data, the display will be extremely difficult to view so that errors may be easily committed during data input if this display is used for reference. The input operation may therefore take considerable time.

Conventional self-contained unmanned vehicles thus require, as the above geographical data, the inputting of a large number of distance data giving the distance to the trajectory side walls at pre-defined path intervals, so that a large memory capacity is required and fine travel position control cannot be achieved. The compilation and entry of these geographical data is therefore tedious and time-consuming and the geographical data are difficult to make sense of.

SUMMARY OF THE INVENTION

The first objective of the present invention is therefore the establishment of a self-contained unmanned vehicle enabling the memory capacity required for the geographical data to be reduced and fine travel position control to be achieved.

The second objective of the present invention is the establishment of a self-contained unmanned vehicle facilitating the compilation and inputting of geographical data and making it possible to easily recognize the meaning of the data.

To achieve the above objects, a self-contained unmanned vehicle according to the first invention comprises a first memory device for storing the coordinate data relating to the nodal points on the trajectory capable of being traversed by the unmanned vehicle; a second memory device for storing the geographical data consisting of operation codes giving the trajectory conditions for the unmanned vehicle and the scene commands with the principal operands indicating the continuous sequence of distances on the trajectory on the basis of operation codes; a setting device for determining, on the basis of the co-ordinate data from the first memory device, the nodes to be traversed by the vehicle on the way toward the specified target location; and a travel controlling device for controlling the travel movement of the unmanned vehicle on the basis of the scene commands by reading out the corresponding scene commands from said second memory device in accordance with the sequence in which the nodal points determined by said trajectory setting device are traversed.

To further achieve the above objects, a self-contained unmanned vehicle according to the second invention comprises a first memory device for storing the coordinate data relating to the nodal points on the trajectory capable of being traversed by the unmanned vehicle; a second memory device for storing the geographical data consisting of operation codes giving the trajectory conditions for the unmanned vehicle and the scene commands with the principal operands indicating the continuous sequence of distances on the trajectory on the basis of operation codes; a setting device for determining, on the basis of the co-ordinate data from the first memory device, the nodes to be traversed by the vehicle on the way toward the specified target location; a travel controlling device for controlling the travel movement of the unmanned vehicle on the basis of the scene commands by reading out the corresponding scene commands from said second memory device in accordance with the sequence in which the nodal points determined by said trajectory setting device are traversed; a geographical data inputting device connected to said second memory device for entering the above geographical data to be input into said second memory device; and a geographical data displaying device for displaying, in the form of different kinds of lines previously set in accordance with the differentiation of said operation codes constituting the above scene commands, line portions whose length corresponds to the value of the above principal operands constituting the above scene commands, during the input operation for entering the above geographic data by means of the above geographical data inputting device.

The above, and other features and advantages of the present invention, will be apparent in the following detailed description of illustrative embodiments thereof which is to be read in connection with the accompanying drawings.

BRIEF DESCRIPTION OF THE DRAWINGS

FIG. 3 is a block schematic showing an example of the geographical data used in the self-contained unmanned vehicle;

DETAILED DESCRIPTION OF PREFERRED EMBODIMENT OF THE INVENTION

Figure 8:
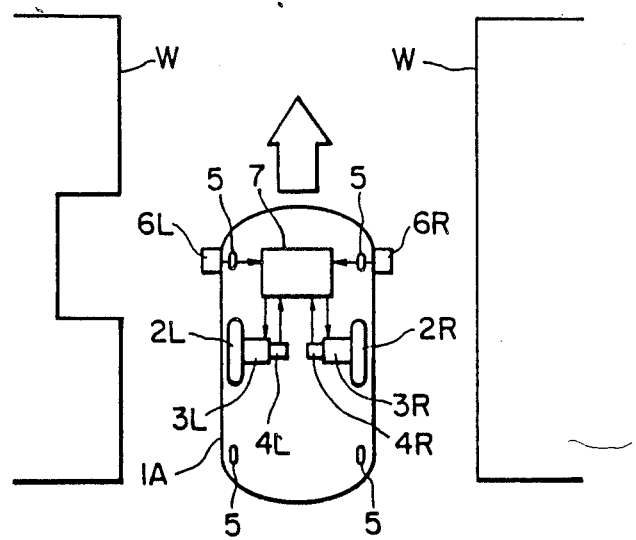
FIG. 8 is a ground plan showing a simplified view of a conventional self-contained unmanned vehicle.
Figure 9:
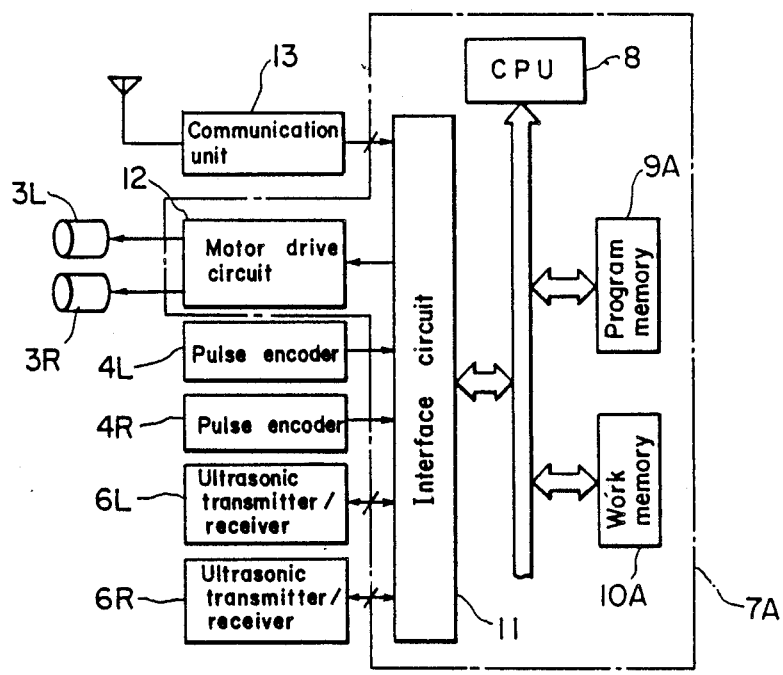
FIG. 9 is a block schematic showing the electrical arrangement of a conventional self-contained unmanned vehicle.
Figure 10:
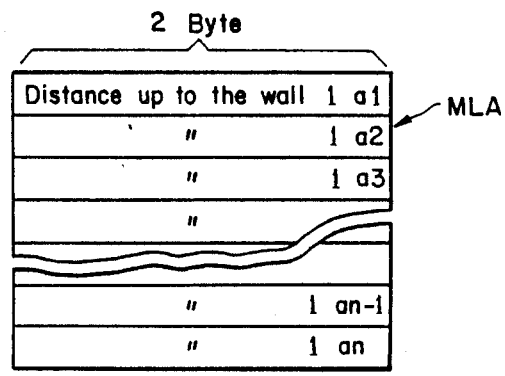
FIG. 10 is a block schematic showing an example of the geographical data used in a conventional self-contained unmanned vehicle.

A self-contained unmanned vehicle according to a preferred embodiment of this invention will be described with reference to FIGS. 1 through 7. In this embodiment, the parts corresponding to FIGS. 8 and 9 referred to above bear the same symbols so that their explanation can be dispensed with here. The self-contained unmanned vehicle of this embodiment has a control unit 7 different from the control unit 7A of a conventional unmanned vehicle and a detachable geographic data inputting device 14.

Figure 1:
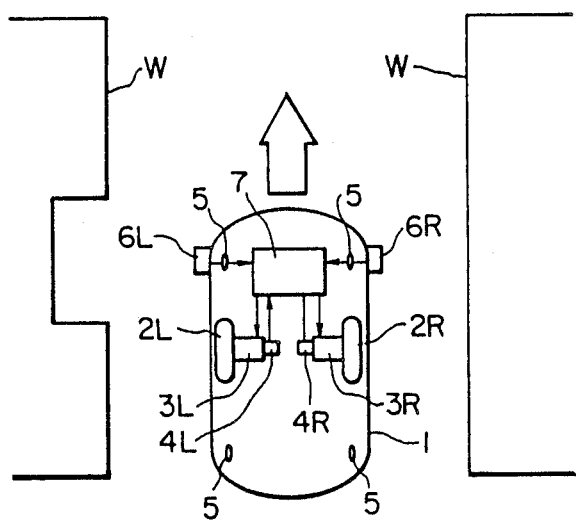
FIG. 1 is a ground plan showing a simplified view of the self-contained unmanned vehicle in accordance with an embodiment of the present invention.
Figure 2:
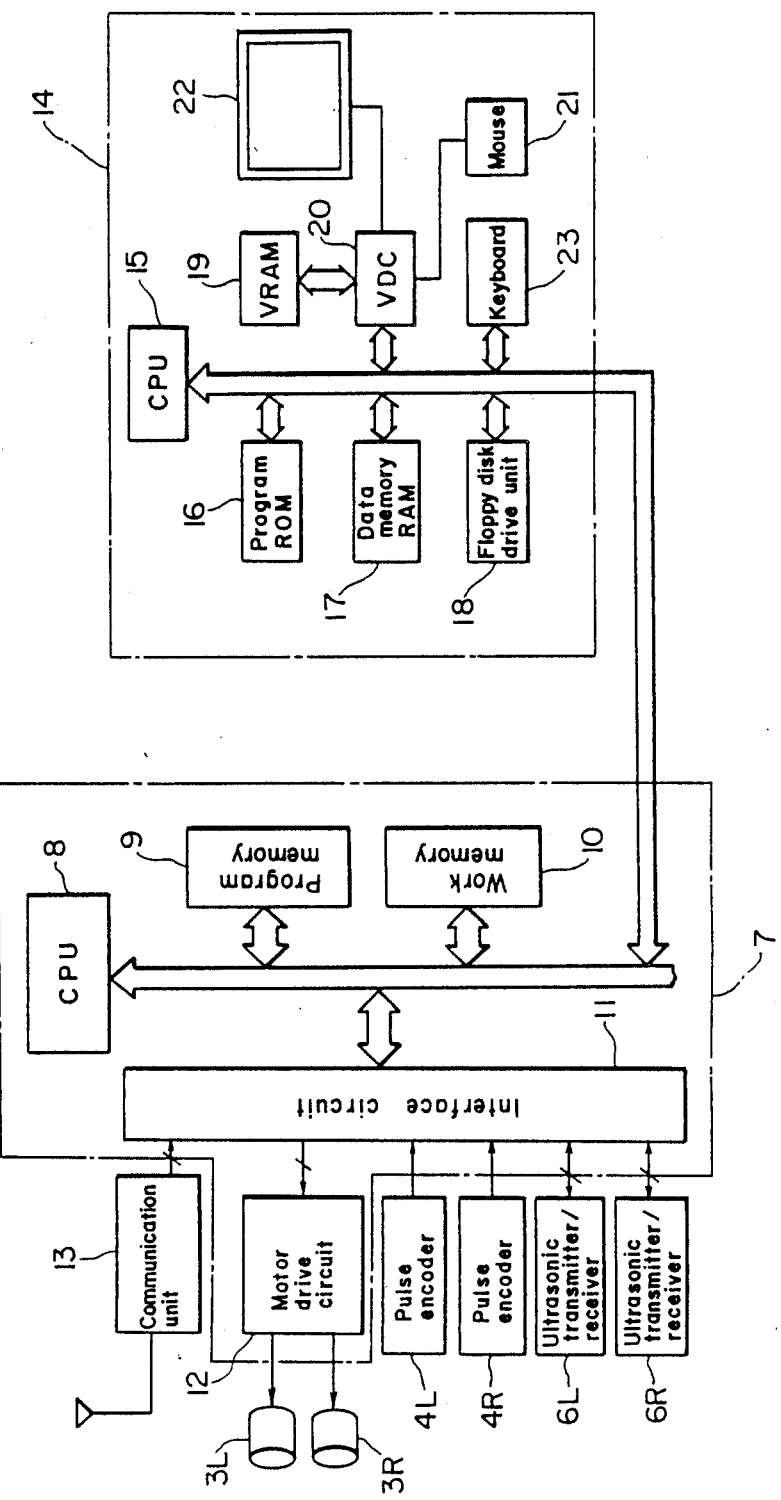
FIG. 2 is a block schematic showing the electrical arrangement of the self-contained unmanned vehicle.

In FIG. 1, item 7 is the control unit. As shown in FIG. 2, this control unit 7 has a central processing unit (CPU) 8, a program memory 9, a work memory 10, an interface circuit 11, and a motor drive circuit 12. A program for controlling the CPU 8 is written into the program memory 9.

The work memory 10 in said control unit 7 is designed to double as the first and second memory device, with geographic data relating to the travel path being written into said work memory 10. This geographic data consists of the coordinate data giving the coordinates of all nodal points, the morphological data for the walls surrounding the pre-determined trajectory passing through the nodal points, and geographic data indicating the continuity of that path.

The CPU 8 and program memory 9 are designed so that they double as a trajectory-determining device for determining, on the basis of the coordinate data of the work memory 10, the nodal points to be traversed on the way toward the target and a movement control device for controlling the locomotion of the unmanned vehicle on the basis of the scene commands by reading the appropriate learn commands (to be dealt with later) from the work memory in accordance with the sequence in which the afore-determined nodes are traversed.

The following is a more detailed description of the aforesaid geographic data.

Walls in factories and offices are generally flat and level, and they are also continuous. In full recognition of these facts, the geographic data are expressed as the shape of the wall endowed with the property of being continuous.

The following three commands, expressing the shape of the wall and its continuity, are proposed as the geographic data. These commands are styled the scene commands and their notation is as follows.

WALL (<distance>, <length>)

<UNDEFINE>::=UNDEFINE (<distance>, <length>)

<OPEN>::=OPEN (<length>)

Whereby the unit of <distance> and <length> is in millimeters.

As shown in FIG. 3, the afore-described scene commands consist of an one-word (2 byte) operation code and a one- or two-word operand.

<OPEN> has a one-word operand and <WALL> and <UNDEFINE> have two-word operands.

The following gives the meanings of each of the scene commands.

(1) WALL (Wall command) has a WALL operation code indicating that the trajectory boundary is a flat and level wall and that the wall is located in a position removed only by the distance indicated by the auxiliary or ancillary operand <distance>. The command indicates that this wall is continuous only over the distance marked by the principal operand <length>.

(2) The uncertainty scene command <UNDEFINE> has an uncertainty operand indicating the uncertainty in specifying the existence or absence of undefinable uncertain objects in the normally defined positions on the lateral boundaries of the trajectory. It indicates that some object is present in the position removed by the distance given as <distance> or that this condition continues only for the distance marked by the principal operand, with the presence of a wall which is difficult to measure or due to the inability to obtain uniform, constant data wit the ultrasound sensor.

(3) The <OPEN> (Space scene command) has a space operand indicating that the lateral boundaries of the trajectory are open and that there is nothing within the measurement range of the ultrasound sensor so that it it is not possible to measure the distance. This indicates that this condition continues only for the distance, marked by the principal operand <length>.

The following explains the manner in which <UNDEFINE> is used.

Assume that a door were present in the travel path of the unmanned vehicle. If the door were normally open, it would be possible to use <OPEN>. If, however, there is any likelihood of the door's being shut, if even for a moment, it will no longer be possible to use <OPEN>. While normally the surrounding is formed by the wall, it may on rare occasions be possible that the wall is cluttered, e.g., by baggage placed in front of it. In this case, it is not possible to use <WALL>. In all of these cases, <UNDEFINE> is used.

The corresponding input data expressing the above commands for at least one side wall of the unmanned vehicle 1 are converted to geographic data and entered into the work memory 10 in the form of geographic data in conjunction with the coordinate data or the nodal points. The length of the above <distance> and <length> parameters is given in meters as the standard unit.

To write into the work memory 10 the geographic data consisting of the above node co-ordinate data and mapping data the unmanned vehicle 1 according to this embodiment, however, is designed so that the control unit 7 is connected, as shown in FIG. 2, when the geographic data are to be entered.

Item 15 in FIG. 2 is the CPU used for the geographic data inputting unit 14; 16 the ROM (read-only memory stores the program for CPU 15; 17 is the RAM (random-access memory) used for data storage; 18 is the floppy disk drive; 19 is the VRAM (video RAM) for the display; 20 is the VDC (video display controller); 21 is the mouse covering the cursor on the display screen; 22 is the CRT display unit; and 23 is the keyboard.

The geographic data inputting device for entering the geographic data into the work memory 10 is here composed of the geographic data input unit 14 with a keyboard 23. The geographic display device for displaying, at the time of performing the geographic data input operations by means of the geographic data input unit 14, the line segments whose length corresponds to the <distance> value of the principal operand constituting the scene command, by differentiating between the previously set types of lines corresponding tot he differentiation of the operation codes (<WALL>, <UNDEFINE>, and <OPEN>) constituting the scene code, consists of said geographic data input unit 14's CPU 15, VRAM 19, VDC 20, and CRT display unit 22. The CRT display unit 22 displays not only the geographic data but also the coordinate data of the nodal points.

The following will explain the entry sequence for geographic data by means of said geographic data input unit 14.

The geographic data are made up from the set of travel origin and target points at any given time, and, as shown in FIG. 2, the geographic data input unit 14 is connected to the control unit 7 of the unmanned vehicle 1 when these data are established.

The coordinates of the nodal points set on the trajectory capable of being traverse by the unmanned vehicle 1 are entered first from the keyboard 23.

Figure 4A:
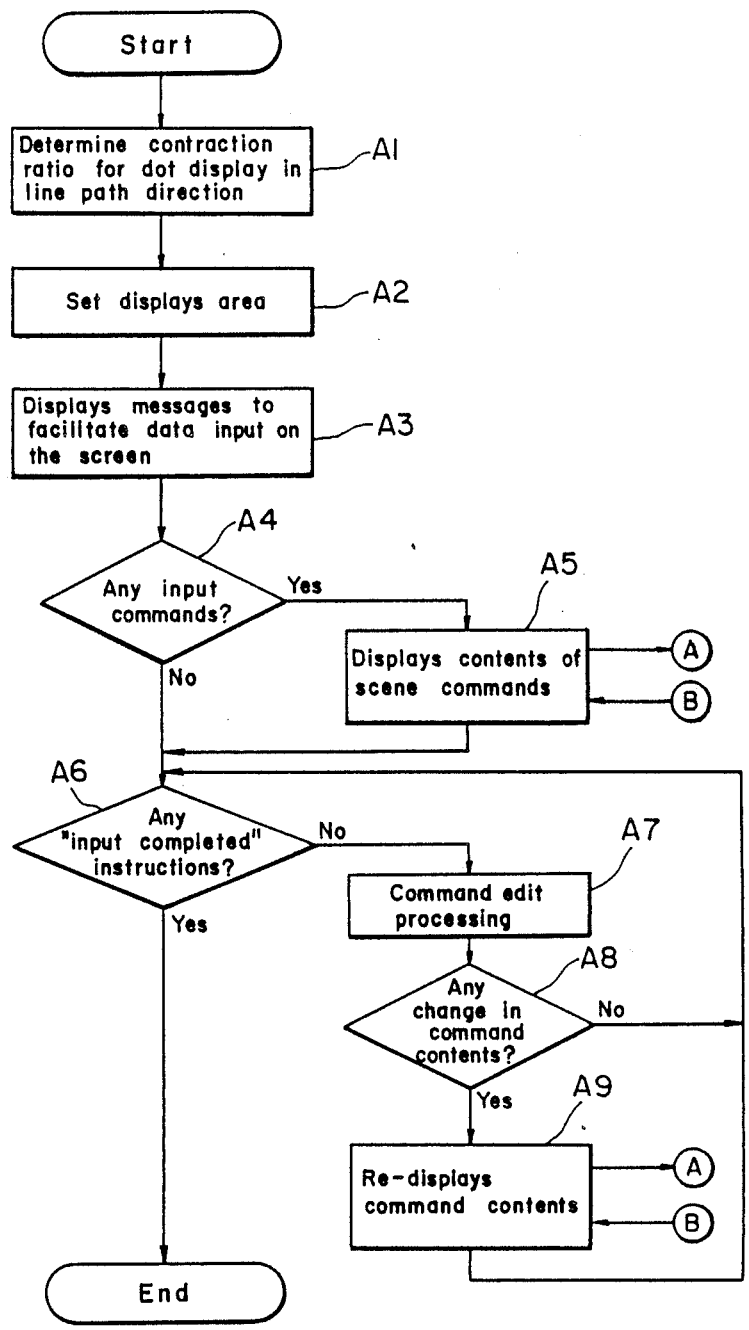
FIGS. 4A–4B together form a flowchart used to explain the sequence in which the geographical data for the self-contained unmanned vehicle are entered.
Figure 4B:
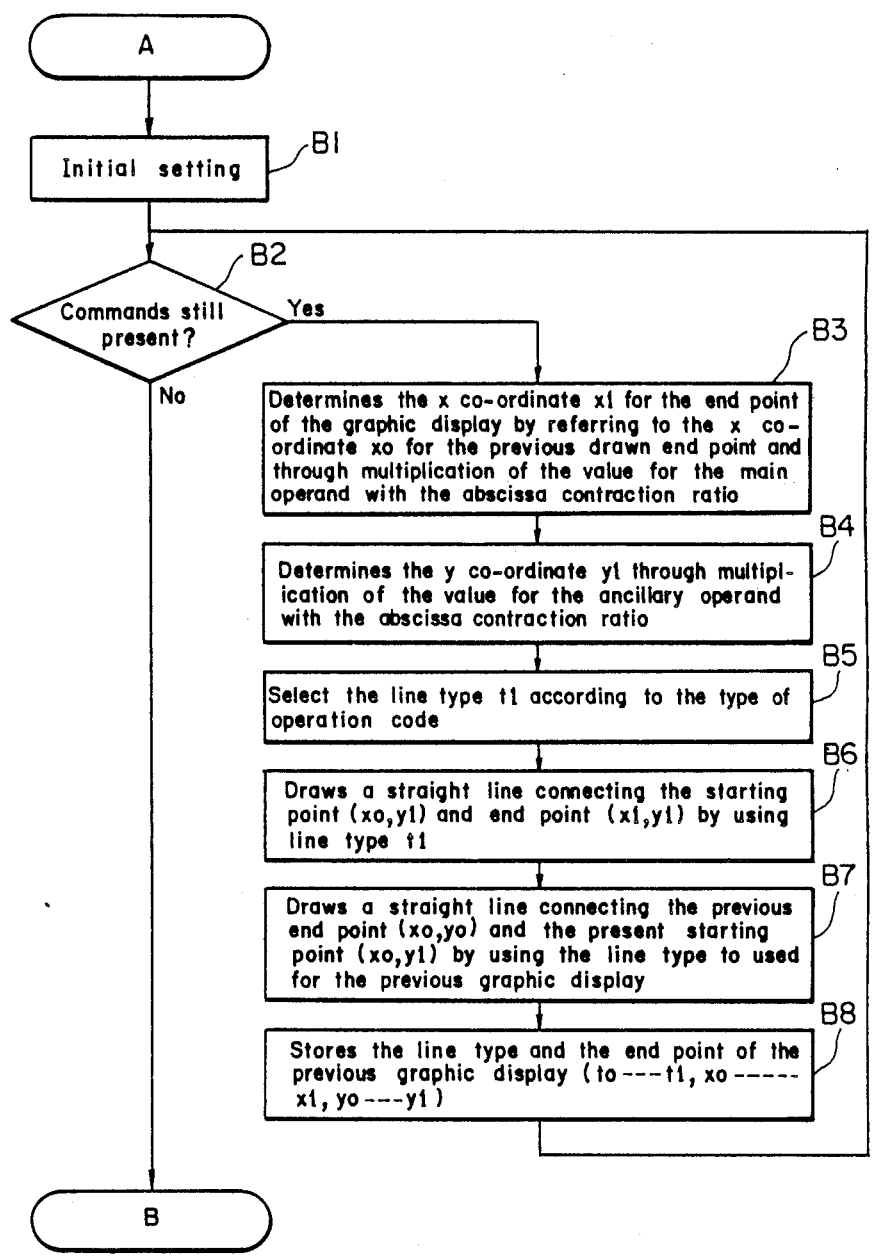

After this, the geographic data relating to the trajectory conditions in the intervals between adjoining nodes are entered as the above scene commands, in accordance with the sequence shown in FIGS. 4A-4B. The program shown in FIGS. 4A-4B is read out from the ROM 16 by CPU 15 and initiated after the node coordinates have been entered.

As shown in FIGS. 4A-4B, the two end nodes for the trajectory in respect of which the scene commands are to be entered, are specified from mouse 21 or keyboard 23 at the time of initiating the input operation to enter the geographic data. The length of the trajectory is then determined from the coordinates of these two end nodes. The contraction rate for the horizontal dot display is determined on the basis of the ratio of this path length to the dot number of the display on the CRT display unit 22. Let us assume, by way of example, that the trajectory length be L and the dot number of the display area of the CRT 22 in the horizontal direction (X axis direction) be D. The dot number/trajectory length ratio is therefore D/L. This D/L quotient will be referred to as the contraction rate for the horizontal display (Step A1). The dot contraction rate for the display area of the CRT display unit 22 in the vertical direction (y-axis direction) is unrelated to the length of the trajectory and always set to a constant value. The contraction rate for the dot display in the y-axis direction will be referred to as the vertical display contraction rate.

Figure 5:
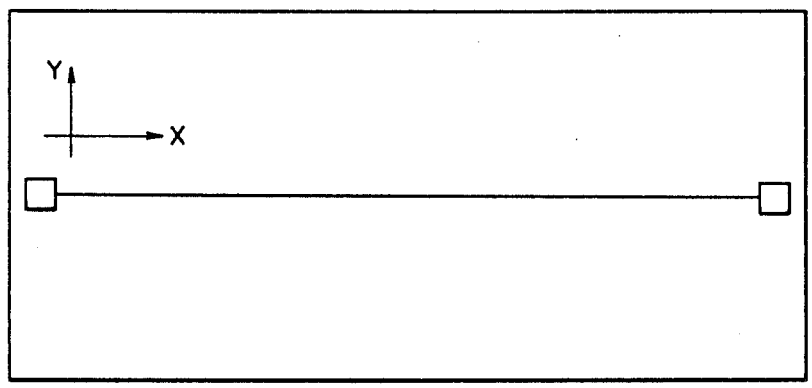
FIG. 5 shows an example of the setting of the display range for the geographical data inputting device of the self-contained unmanned vehicle.
Figure 6:
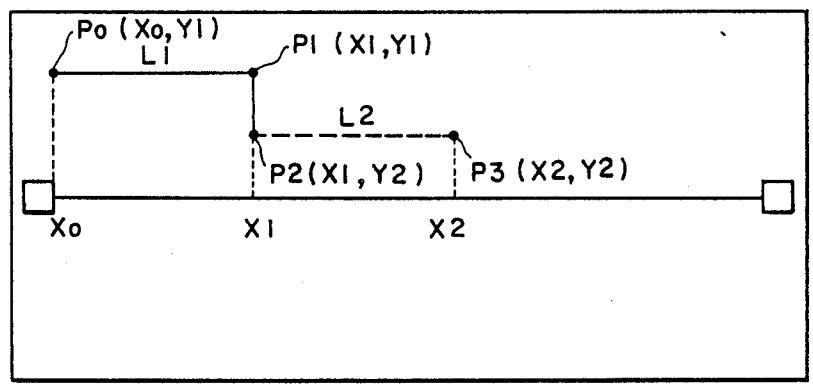
FIG. 6 shows a further example of the display of the geographical data in the geographical data inputting device of the self-contained unmanned vehicle.

In step A2, the display area on the screen of the CRT display unit 22 is set as shown in FIG. 5. The setting procedure is as follows. The area giving a graphic representation of the commands is boxed in to obtain a display showing the nodes in the exact center position between the left and right sides (corresponding to the rectangular formed by the left and right sides in FIG. 5). The travel path is then indicated as the path obtained by inter-linking the nodes with a certain type or certain types of line (to be explained later). As shown in the figure, the display area constitutes a co-ordinate system (t,y) whose origin is at the bottom left edge of the display area.

Step A3 consists of displaying, on the display screen, messages facilitating the entry of the previously defined scene commands. To enter the scene commands, the operator will operate the keyboard 23 to enter the afore-mentioned operation codes, the main operands and the secondary or ancillary operands. These three items are entered in this sequence. Sometimes it may not be necessary to have ancillary operands, as is the case with interval scene commands. If no ancillary operands are required, the input will be limited to 2 items.

Step A4 is a standby step for the entry of the scene commands. When these scene commands are entered as described above, the scene command data will be image-processed (in a manner described hereinafter) in step A5 to obtain a display corresponding to said scene commands. After image-processing, the sequence will proceed to step A6. In step A5, A and B give the subroutine inputs and outputs, as stated in FIG. 4B.

The following step (step A6) is a detection sequence to judge whether or not the scene command entry has been specified as being completed. If completed, the entry operation for the scene commands will be finished, and if not, the scene commands will be edited in the next step (step A7). The next step (step A8) consists of a judgment sequence to detect whether a change in the scene commands has occurred. If unchanged, the sequence returns to step A6, and if changed, the sequence progresses to the next step (step A9) in which the scene commands are again image-processed (in the manner described hereinafter). After this image-processing operation, the sequence returns to step A6, and the procedure will be terminated if an entry has been made specifying the end of scene command input.

The image-processing operations implemented in steps A5 and A9 are performed in the sequence shown in FIG. 4B. The sequence is as follows. After the initial setting of the display routine (step B1), a judgment operation takes place (step B2) to detect whether or not input commands are present. If no input commands are present, the sequence returns to the previous step, and if input commands are present, the sequence will progress to the next step (step B3).

In step B3, the horizontal display contraction ratio (D/L) is multiplied by the main operand value and the result is added to the X co-ordinate Xo of the end-point of the previous image to obtain the X co-ordinate X1 of the image end-point.

In the next step (step B4), the vertical display contraction ratio is multiplied by the ancillary operand value to obtain the y co-ordinate Y1. Step B5 then consists of selecting the line type t1 in accordance with the nature of the operation code. The line type t1 thus selected is then used, in step B6, to draw the straight line connecting the starting point (Xo, Y1) and the end-point (X1, Y1). After the straight line connecting the previous end-point (Xo, Yo) with the present starting point (Xo, Y1) has been drawn, in step B7, by using the previous graphic line type to, the line type t1 and the graphic end-point (X1, Y1) are stored in the memory device (step B8) for the next graphic representation. The sequence then goes back to step B2 to return if no scene commands are left.

The following explains the image-processing operation in fuller detail. The scene commands consist of the line type discriminator (operand), the distance to the wall boundary (ancillary operand), and the interval length (main operand) or the discriminator and the interval length. The line type discriminator is used to determine the line type for the graphic representation, The distance to the wall boundary and the vertical display contraction ratio are used to determine the length of the Y axis direction as shown in FIG. 5. The interval length and horizontal display contraction ratio (D/L) determined in step A1 are used to define the position of the X axis.

Let us assume, for example, that a line segment L1 (Po to P1) is to be drawn graphically by means of the line t1 (continuous line). When the next scene command is entered, the value for the X co-ordinate of the starting point P2 of the line segment (P2 to P3) relating to the next scene command is determined on the basis of the X co-ordinate of point P1 while the Y co-ordinates of starting point P2 and end-point P3 are determined on the basis of the wall distance (ancillary operand) of the scene command, the X co-ordinate of the end-point P3 being determined by the equation:

$$X2 = X1 + (L \times D/L)$$

by using the interval distance L (main operand). When the co-ordinates of P2 and P3 have been determined in this manner, the appropriate line segment is drawn with the line type t2 (dotted line) corresponding to the type discrimination for the scene command operation code. The same line type t1 (continuous line) as has been used for the line segment L1 is then used to draw the line interconnecting P1 and P2. The term "line type" used in this context refers to a combination of lines including continuous, dotted, bold, and fine lines as well as colored lines if a color display is used.

For the scene commands without an ancillary operand, it is convenient to produce the graphic display by assigning a zero value to the ancillary operand.

This allows the operator to enter the scene commands while checking the display on the screen of the CRT display unit 22. When the scene command input has been completed, the geographic data and the co-ordinates for each node are written into a floppy disk in the floppy disk drive unit 18 as the geographic information. After the data have been read out onto the floppy disk, the geographic data will be transferred, by means of a separate memory input device that is not shown in the figure, from the floppy disk to the work memory 10 mounted on the unmanned vehicle. The types of work memory device 10 that can be used for this purpose may include memory facilities such as a bubble memory cassette or IC card.

After the geographic data have been compiled and entered into the work memory 10 in the manner aforedescribed, the unmanned vehicle 1, according to the present embodiment of the invention using said control unit 7, will operate in the following manner. To explain the operation of the unmanned vehicle 1, the geographic data used will be the respective data referring to the left and right side walls W, that is, the geographic ML and MR data not shown in the drawing.

The central processing unit CPU 8 then effects control in accordance with the program written into the program memory.

When the CPU 8 receives the target location node from the central control station, it will first seek the optimum path on the basis of the geographic data entered into the work memory 10 to determine the nodes traversed in approaching the target location. The CPU 8 will then read out the appropriate shapes of the left and right side walls covering the space between one node and the following node, and the scene command giving the continuity of the path between successive nodes from the geographic data ML and MR.

Figure 7:
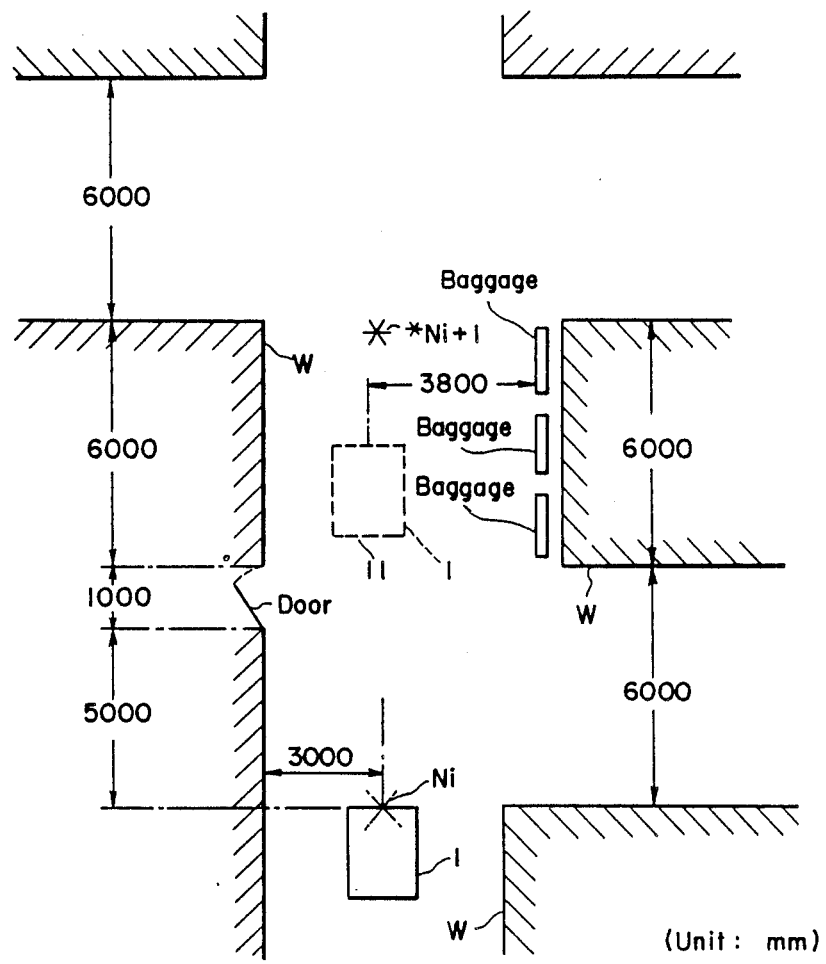
FIG. 7 is a drawing used to explain the operation of the self-contained unmanned vehicle.

FIG. 7 shows the shape of the left and right side walls covering the space between node Ni and node Ni + 1 and the continuity therebetween. The corresponding scene commands are entered into the work memory 10 in the following manner.

(1) For the left side wall W, the scene commands are:
aL WALL (<3000>, <5000>)
bL UNDEFINE (<3000>, <1000>)
cL WALL (<3000>, <6000>)

(2) For the right side wall W, the scene commands are:
aR OPEN (<6000>)
bR UNDEFINE (<3800>, <6000>)
(Unit:mm)

The operation of the unmanned vehicle traversing the distance between node Ni and node Ni+1 under the above scene commands will be explained below by referring to this figure.

The CPU 8 first reads the scene command (1L) and then checks the shape of the left side wall W. In this instance, the left side wall W is <WALL> and the distance from the left side wall is 3000 mm, with the <WALL> extending over 5000 mm. The CPU 8 then reads the aR scene demand to identify the shape of the right side wall W. In this instance, the right side wall is <OPEN>, with the <OPEN> extending over 6000 mm. Since the aR scene commands cannot be used as the travel reference for the unmanned vehicle, the CPU 8 will ignore this scene commands and activate the 3L and 3R (FIG. 1) motors to cause the unmanned vehicle to travel at a constant speed in accordance with the aL scene commands.

The CPU 8 will now measure the distance to the left side wall on the basis of the signals (which are continuously transmitted) supplied from the ultrasonic sensor 6L, and the result of this measurement is compared with the distance of 3000 mm to assess whether or not the unmanned vehicles has deviated from the regular scheduled travel position. If it has deviated, the motor control circuit 12 will be actuated in such a manner as to restore the regular position. The CPU 8 will then total the signals supplied from the pulse encoders 4L and 4R for travel across the 5000 mm distance.

Immediately before the unmanned vehicle 1 completes its travel over the 5000 mm distance, the CPU 8 will read the next scene command (bL) to identify the shape of the left side wall. In this instance, the left side wall is <UNDEFINE>, and the distance up to <UNDEFINE> is 3000 mm, with the <UNDEFINE> extending over 1000 mm. The <UNDEFINE> shown here signifies the presence of a door. The CPU 8 will continue to ignore the right side the command while the right side wall W remain int he <OPEN> position The CPU 8 will also ignore the (bL) scene command since this cannot be used as a travel reference, so that travel motion will continue at a constant speed, with the previous condition being retained. The CPU 8 will then total the signals supplied from the pulse encoders 4L and 4R for travel across the 1000 mm distance.

Immediately before the unmanned vehicle 1 completes its travel over the 1000 mm distance, the CPU 8 will read the next scene command (cL) to identify the shape of the left side wall. In this instance, the left side wall is <WALL>, with the <WALL> extending over 6000 mm. The CPU will then read the (bR) scene command to identify the shape of the right side wall W. In this instance, the right side wall is <UNDEFINE>, and the distance up to this <UNDEFINE> is 3800 mm, with the <UNDEFINE> extending over 6000 mm. The <UNDEFINE> shown here refers to a baggage positioned parallel to the wall. The CPU 8 will then measure the distance up to the left side wall and correct the travel position with the 6000 mm distance so that the distance up to the left side wall will be constant. After travel over the 6000 mm distance, the unmanned vehicle 1 will arrive at node Ni + 1.

Thereafter, the same procedure will be repeated each time a scene command is read after node Ni + 1, until the final target location is reached.

The following explains the control procedure for the travel position of the unmanned vehicle 1 if a different unmanned vehicle is approaching from the forward direction.

Let us assume that while the unmanned vehicle 1 is traversing the distance defined by <WALL> and <UNDEFINE>, said other unmanned vehicle (not shown in the figure) is approaching from the forward direction. If there is any danger of collision between the two unmanned vehicles, the unmanned vehicle 1 will change its travel position, under its own judgment, in such a manner as to avoid collision within the distance shown as <distance>. If it should not be possible to escape, within the distance shown as <distance>, the other unmanned vehicle will also be made to change its travel position.

Let us next assume that while the unmanned vehicle 1 is traversing the distance defined by <OPEN>, said other unmanned vehicle is approaching from the forward direction. If there is any danger of collision between the two unmanned vehicles, the unmanned vehicle 1 will change its travel position by setting a non-specified distance within which is can avoid collisions since the distance with respect to the periphery cannot be controlled. In this instance, it is not necessary to cause the second unmanned vehicle to change its travel position since the distance defined by <OPEN> is sufficiently wide.

As described above in detail, the preferred embodiment according to the present invention provides the following advantages.

(1) As travel control is achieved by suitable read-out of the scene commands from the geographic data during the travel period from the commencement to the termination of travel, the mere assignment of a single scene command for any one given constant distance segment or interval of the travel path will suffice. While this necessitates the additional use of 1 set of data, as compared with the conventional geographic data, the amount of geographic data required as a whole is extremely small as a single scene command can cover an average of several meters.

(2) The geographic data in accordance with this invention are treated as covering a continuous distance up to the wall, so that it is possible to achieve a very fine travel position control.

(3) Scene commands such as <WALL>, <UNDEFINE>, and <OPEN> are easy to understand and easy to establish as geographic data since they are readily accessible to human comprehension and thought.

(4) To enter geographic data consisting of scene commands it is possible to display, for direct visual monitoring, the scene commands on a display screen so that the progress of data entry and input errors can be checked very easily, thereby permitting the quick and easy entry of geographic data.

In the present embodiment according to this invention, an ultrasonic sensor is used for the detection of the boundary shape. Instead of such an ultrasonic sensor, however, detection of the wall configuration may also be achieved by means of other sensor devices such as laser beam sensors or video input systems with charge-coupled devices (CCD).

Moreover, in the present embodiment according to this invention, three types of scene command are used. If the wall has a difficult configuration, however, it is also possible to add further scene commands commensurate with the boundary complexity.

Furthermore, in the present embodiment according to this invention, a CRT display device is used for the displaying of geographic data such as scene commands. The use of display devices is not limited to CRT devices and many other types of display unit may be employed.

The hardware equipment for the geographic data input unit 14 used in the present embodiment according to this invention is in much more common use than the conventional data input hardware. The program (software) shown in FIGS. 4A–4B and used for operating the geographic data input unit 14, however, is more particular.

Further, the geographic data input unit 14 used in the present embodiment according to this invention may either be continuously kept connected to the control unit 7 of the unmanned vehicle 1 or intermittently connected thereto as and when required.

What is claimed is:

1. An unmanned vehicle comprising:
a first memory means for storing coordinate data relating to nodes on a trajectory to be selectively traversed by the unmanned vehicle;
a second memory means for storing geographical data consisting of operation codes corresponding to trajectory conditions for the unmanned vehicle and scene commands;
a trajectory setting means for determining, o the basis of the coordinate data from said first memory means, a sequence of nodes to be traversed by the vehicle on the way towards a specified target location; and
a travel controlling means for controlling the travel movement of the unmanned vehicle on the basis of said scene commands by reading to the corresponding scene commands from said second memory means in accordance with the sequence in which said nodes determined by said trajectory setting means are to be traversed.

2. A self-contained unmanned vehicle according to claim 1, in which said scene commands represent wall scene commands consisting of wall operation codes denoting the lateral periphery of the travel path as being a level wall, main operands denoting that the travel path represents a continuous distance to be travelled by the vehicle under the operation code for the same wall, and ancillary operands denoting a constant distance from said wall to a trajectory of the vehicle.

3. A self-contained unmanned vehicle according to claim 1, in which said scene commands represent undefined wall scene commands consisting of undefined operation codes denoting the possibility of there being undefined objects incapable of being defined in a normal specified position on the lateral periphery of the travel path, main operands denoting that the travel path represents a continuous distance to be travelled by the vehicle under said undefined operation code, and ancillary operands denoting a constant distance from said undefined objects to a trajectory of the vehicle.

4. A self-contained unmanned vehicle according to claim 1, in which said scene commands represent space scene commands consisting of space operation codes denoting the impossibility of measuring the distance, with the lateral periphery being the space, and main operands denoting that the travel path represents a continuous distance to be travelled in the vehicle under the operation code for the same space.

5. A self-contained unmanned vehicle according to claim 1, in which said geographic data consists of the wall scene commands, the undefined scene commands, and the space commands.

6. A self-contained unmanned vehicle comprising:
a first memory means for storing coordinate data relating to nodes on a trajectory to be selectively traversed by the unmanned vehicle;
a second memory means for storing geographical data consisting of operation codes corresponding to trajectory conditions of the unmanned vehicle and scene commands;
a trajectory setting means for determining, on the basis of the coordinate data from said first memory means, a sequence of nodes to be traversed by the vehicle on its approach towards a specified target location;
a travel controlling device for controlling the travel movement of the unmanned vehicle on the basis of said scene commands by reading out the corresponding scene commands from said second memory means in accordance with the sequence in which said nodes determined by said trajectory setting device are to be traversed;
a geographical data input means connected to said second memory means for entering said geographic data to be input into said memory means; and
a geographical data display means for displaying, in the form of different types of lines each corresponding to one of said operation codes constituting said scene commands, line portions whose length corresponds to said scene commands, during the input operation for entering said geographic data by means of said geographical data input means.

7. A self-contained unmanned vehicle according to claim 6, in which said scene commands represent wall scene commands consisting of wall operation codes denoting the lateral periphery of the travel path as being a level wall, main operands denoting that the travel path represents a continuous distance to be travelled by the vehicle under the operation code for the same wall, and ancillary operands denoting a constant distance from said wall to a trajectory of the vehicle.

8. A self-contained unmanned vehicle according to claim 6, in which said scene commands represent undefined wall scene commands consisting of undefined operation codes denoting the possibility of there being undefined objects incapable of being defined in a normal specified position on the lateral periphery of the travel path, main operands denoting that the travel path represents a continuous distance to be travelled by the vehicle under said undefined operation code, and ancillary operands denoting a constant distance from said undefined objects to a trajectory of the vehicle.

9. A self-contained unmanned vehicle according to claim 6, in which said scene commands represent space scene commands consisting of space operation codes denoting the impossibility of measuring the distance, with the lateral periphery being the space, and main operands denoting that the travel path represents a continuous distance to be travelled in the vehicle under the operation code for the same space.

10. A self-contained unmanned vehicle according to claim 6, in which said geographic data consists of the wall scene commands, the undefined scene commands, and the space commands.

* * * * *